United States Patent [19]
Dwyer et al.

[11] Patent Number: 5,984,565
[45] Date of Patent: Nov. 16, 1999

[54] SPRING-LOADED COUPLING MECHANISM

[76] Inventors: Benjamin T. Dwyer; Karen K. Dwyer; Aaron P. Dwyer, all of P.O.Box 105, Alexander, N. Dak. 58831

[21] Appl. No.: 08/940,120

[22] Filed: Sep. 29, 1997

[51] Int. Cl.$^6$ ...................................................... B25G 3/18
[52] U.S. Cl. .................. 403/325; 403/409.1; 403/322.1; 24/653; 24/656; 24/628
[58] Field of Search ................................ 403/321, 322.1, 403/322.2, 325, 374.1, 409.1, 353, 329, 326; 24/653, 655, 656, 628; 74/502.6

[56] References Cited

U.S. PATENT DOCUMENTS

| | | | |
|---|---|---|---|
| 2,556,117 | 6/1951 | Smith et al. | 403/353 |
| 2,902,304 | 9/1959 | Smith | 24/653 |
| 3,332,117 | 7/1967 | McCarthy | 403/325 |

*Primary Examiner*—Harry C. Kim
*Assistant Examiner*—David E. Bochna
*Attorney, Agent, or Firm*—David A. Lingbeck

[57] ABSTRACT

A spring-loaded coupling mechanism includes a tubular housing having an internal cavity, a forward end, a rearward end, and a tapered forward portion and further includes a catch member which is connected to a first elongate support member and is biasedly seated in said tapered portion of said housing, the first elongate support member being attached to an object, and also includes a connecting member which is attached to a second elongate support member and which is extendible and releasably securable inside the housing with the second elongate support member being substantially taut and being attached to another object. This spring-loaded coupling mechanism easily and conveniently ties at least two objects together such as a boat being moored to a dock or on a trailer.

1 Claim, 3 Drawing Sheets

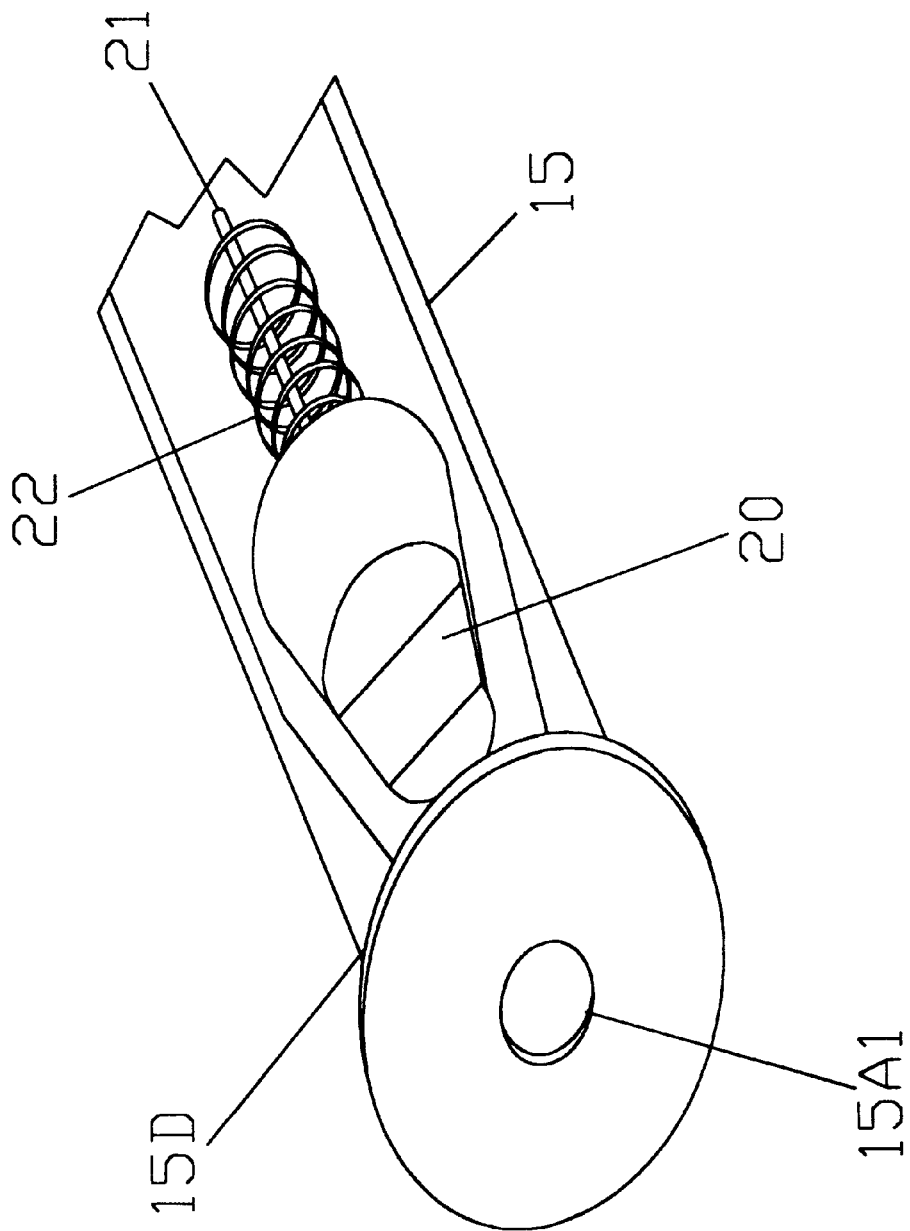

SPRING-LOADED COUPLING MECHANISM

BACKGROUND OF THE INVENTION

This invention relates to a spring-loaded coupling mechanism which is capable of coupling together two objects such as mooring a boat to a dock or on a trailer.

Most objects which are hingedly coupled to other complimentary objects are essentially permanently coupled to each other such as lids being coupled to containers. Those objects which are not permanently coupled together are coupled together with rope or with a hook and loop. For example, coupling or mooring a boat to a dock includes using a rope having a loop at one end and being tied to the boat at the other end with the loop being adapted to slip over the top of a post on the dock. Securing a boat on a trailer includes a rope having a hook at one end which is adapted to clip or hook about a loop connected to the boat. Other types of coupling means includes the following:

One known prior art is an EMERGENCY OPENING LATCH, U.S. Pat. No. 3,338,609, issued on Aug. 29, 1967 and invented by H. C. Banas, which comprises a central coupling section, an outer section pivotally connected to the central coupling section, an arm member pivotally secured to the central coupling section, and a releasing means being secured to the arm member for disengaging the outer section from the central coupling section.

Another known prior art is a RELEASABLE HINGE FOR SWINGABLE PORTIONS OF A CONTAINER, U.S. Pat. No. 4,302,866, issued on Dec. 1, 1981 and invented by Ronald D. Irvin, which comprises a pair of spring fingers and a blind notch on the cover and bottom walls of a container for receiving the spring fingers.

Another known prior art is a HINGE HAVING A LATERALLY OUTWARDLY EXTENDING FLAT SPRING, U.S. Pat. No. 4,455,711, issued on Jun. 26, 1984 and invented by John P. Anderson, which comprises a housing having a first tube thereon, a pin for sliding in the first tube, and a flat spring having a first end and a second end fixed to the pin.

None of the prior art discloses or suggests the present invention which allows the user to quickly and easily couple two objects together by simply inserting a connecting member inside a housing.

SUMMARY OF THE INVENTION

The present invention relates to a spring-loaded coupling mechanism which comprises a tubular housing having a hole through the rearward end and a hole through the forward end with the forward portion of the cavity being tapered inwardly and toward the forward end, and further comprises a catch member fixedly attached to a first elongate support member which extends through the hole in the rearward end and which supports a spring member which rests against the rearward end and biases the catch member into contact with the tapered portion of the cavity. A substantially round connecting member being conventionally connected to a second elongate support member is extendible and securable inside the housing though the forward end and is engageable between the catch member and the interior of the housing. A first stop member is fixedly attached to the second elongate support member at a selected distance from the connecting member, and a second stop member is movably disposed between the first stop member and the connecting member and is attached to an end of a compression spring means which has another end resting against the first stop member. This spring-loaded coupling mechanism is ideal for conveniently and easily coupling two objects together. The first elongate support member is essentially connected to a one object such as a post disposed on a dock, and the second elongate support member is connected to a another object such as a boat and to couple the two objects together, the user inserts the connecting member into the housing so that the connecting member releasably engages between the catch member and the wall of the housing.

One objective of the present invention is to provide a spring-loaded coupling mechanism which allows the user to easily and conveniently couple two objects together.

Another objective of the present invention is to provide a spring-loaded coupling mechanism which eliminates the user having to tie two objects together with a rope such as mooring a boat to a dock or on a trailer.

Yet, another objective of the present invention is to provide a spring-loaded coupling mechanism which allows the user to quickly couple and de-couple two objects together by simply inserting the connecting member inside the housing until it becomes securely engaged therein.

Further objectives and advantages of the present invention will become apparent as the description proceeds and when taken in conjunction with the accompanying drawings wherein:

BRIEF DESCRIPTION OF THE DRAWINGS

FIG. 3 is a detailed perspective view of the catch member.

DETAILED DESCRIPTION OF THE INVENTION

Figure 1:
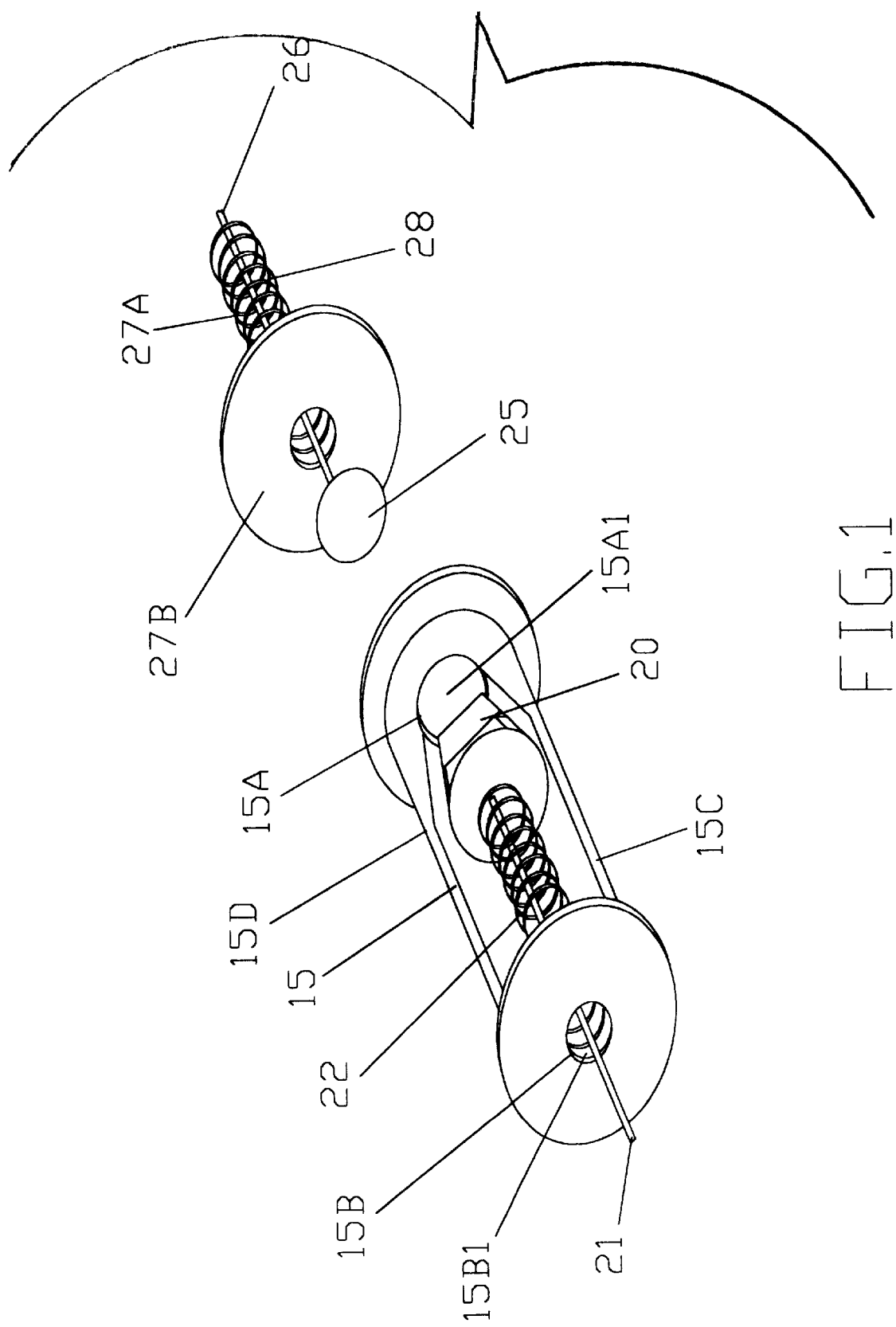
FIG. 1 is a rear perspective view of the spring-loaded coupling mechanism.
Figure 2:
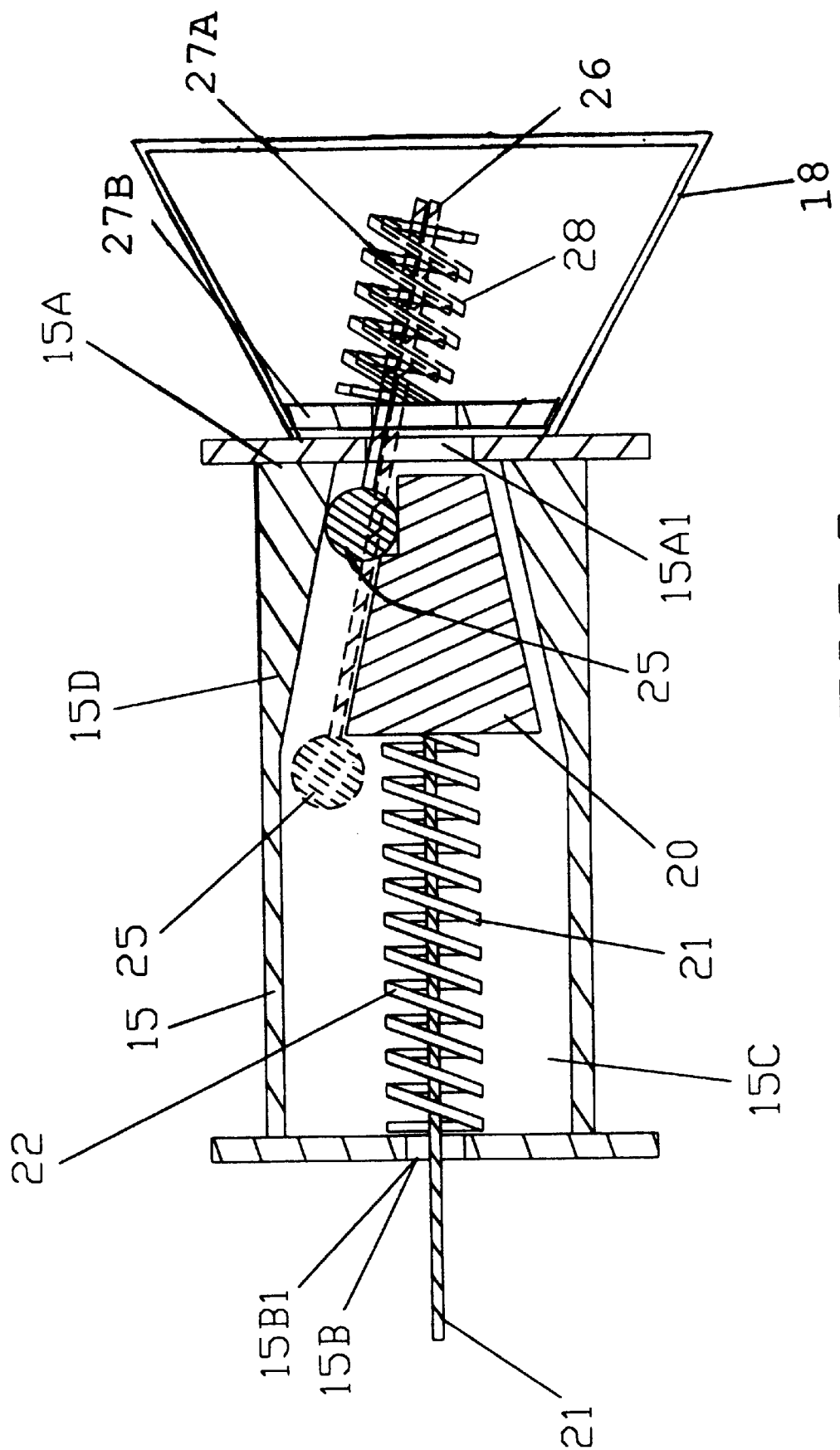
FIG. 2 is a side elevational view of the spring-loaded coupling mechanism showing, in particular, a longitudinal cross-sectional view of the housing and the connecting member engaged therein.

Referring to the drawings in FIGS. 1–3, in particular, the spring-loaded coupling mechanism comprises a tubular housing 15 having a forward end 15A and a rearward end 15B with each end having a hole 15A1–B1 therethrough into an internal cavity 15C of the housing 15, a forward portion of the cavity 15C being tapered inwardly and toward the forward end 15A of the housing 15. A catch member 20, at least a portion of which has a generally right angle longitudinal cross-section, is movably disposed inside the internal cavity 15C of the housing 15 and is fixedly attached by conventional means to a first elongate support member 21 which movably extends through the hole 15B1 in the rearward end 15B of the housing 15; wherein, the catch member 20 is positioned inside the housing 15 such that the right angle longitudinal cross-section faces toward the tapered portion 15D of the cavity 15C and toward the forward end 15A of the housing 15. As shown in FIG. 2, a spring member 22 is disposed inside the housing 15 and is mounted about the first elongate support member 21 and has an end which rests against the inner side of the rearward end 15B of the housing 15 and biasedly seats the catch member 20 in the tapered portion 15D of the housing 15. The portion of the first elongate support member 21 not extendible inside the housing 15 is attached or connected by conventional means to an object which is capable of being coupled to another object which is attached to a second elongate support member 26 which has an end fixedly attached by conventional means to a substantially round connecting member 25 which is extendible and releasably securable inside the housing 15 through the hole 15A1 in the forward end 15A. A first stop member 27A is fixedly mounted by conventional means about the second elongate support member 26 a selected distance from the connecting member 25, and a second stop member 27B is movably mounted about the second elongate support member 26 between the connecting member 25 and the first stop member 27A. A compression spring means 28 is mounted about the second elongate support member 26 and has one end resting against the first stop member 27A and has the other end fixedly attached or welded to the second stop member 27B and biases the second stop member 27B into contact with the outerside of the forward end 15A of the housing 15 when the connecting member 25 is securely engaged inside thereof. Once the connecting member 25 is secured inside the housing 15, the spring means 28 urges against the first stop member 27A with the second stop member 27B being in contactable relationship with the forward end 15A of the housing 15 to substantially tighten the second elongate support member 26 which essentially insures that the connecting member 25 remain securely engaged either between the catch member 20 and the wall of the housing 15 or behind the catch member 20.

To use the spring-loaded coupling mechanism, the user ties one end of the first elongate support member 21 which is not extendible inside the housing 15 to an object such as a dock and ties one end of the second elongate support member 26 which is also not extendible inside the housing 15 to another object such as the bow of a boat; and then moves the first elongate support member 21 rearwardly relative to the housing 15 so as to unseat the catch member 20 from the tapered portion 15D of the housing 15, the catch member 20 being seated in the tapered portion 15D of the cavity 15C; and then extends the round connecting member 25 through the hole 15A1 in the forward end 15A of the housing 15 beyond the tapered portion 15D; and then releases the first elongate support member 21 to allow the catch member 20 to move into engagement with the connecting member 25 which is either received in the right angle longitudinal cross-section of the catch member 20 and securely engaged between the catch member 20 and the interior of the housing 15 or engaged behind the catch member 20 between the catch member 20 and the rearward end 15B of the housing 15; wherein the catch member 20 prevents the connecting member 25 from exiting the housing 15 through the hole 15A1 in the forward end 15A either by blocking the passage through the housing 15 with the connecting member 25 being to the rearward side of the catch member 20 which is biasedly seated in the tapered portion 15D of the housing 15 or by receiving the connecting member 25 in the right angle cross section and engaging the connecting member 25 between the catch member 20 and the wall of the housing 15, in particular, the tapered portion 15D of the cavity 15C. By the connecting member 25 being releasably secured inside the housing 15 by the catch member 20, the objects which are attached to the respective lines are coupled together. Optionally, a funnel-like member 18 is conventionally and fixedly attached to and extending from the forward end 15A of the housing 15 to facilitate the coupling or extending of the connecting member 25 through the hole 15A1 in the forward end 15A of the housing 15 by funneling the connecting member 25 toward the hole 15A1 in the forward end 15A of the housing 15.

To de-couple the objects, the user urges the first elongate support member 21 rearwardly relative to the housing 15, which un-seats the catch member 20 from the tapered portion 15D and disengages the catch member 20 from the connecting member 25 which, because of the force of the spring means 28 on the second elongate support member 26, exits the housing 15 through the hole 15A1 in the forward end 15A thereof. The user only has to momentarily move the first elongate support member 21 rearwardly sufficient to disengage the catch member 20 from the connecting member 25. Many objects can be easily and conveniently coupled together by using this spring-loaded coupling mechanism.

Various changes and departures may be made to the invention without departing from the spirit and scope thereof. Accordingly, it is not intended that the invention be limited to that specifically described in the specification or as illustrated in the drawings but only as set forth in the claims.

What is claimed is:

1. A coupling mechanism comprising:

a tubular housing having an internal cavity, a forward end, a rearward end and at least two holes extending in said internal cavity, said internal cavity having a tapered forward portion;

a connecting means being extendible and securable in said tubular housing, said connecting means being attachable to an object and including a second elongate support member extendible through another of said at least two holes, a connecting member being attached to said second elongate support member and being extendible and releasably securable inside said housing; and a catch means for releasably and securably retaining said connecting means inside said tubular housing, said catch means being attachable to another object and including a first elongate support member movably extending through one of said holes and is attachable to said object, a catch member movably disposed in said internal cavity and being attached to said first elongate support member and having a substantially right angle longitudinal cross-section and being dimensioned to allow said connecting member to move beyond said catch member when said catch member is unseated from said tapered portion of said housing such that when said catch member is reseated in said tapered portion, said connecting member being prevented from exiting said housing, and a spring member mounted about said first elongate support member and biasedly seating said catch member in said tapered portion.

* * * * *